United States Patent [19]

Borbas et al.

[11] Patent Number: 5,369,680

[45] Date of Patent: Nov. 29, 1994

[54] PRO-ACTIVE BILLING AND ROUTING TEST SET

[75] Inventors: William F. Borbas, Woodridge; Douglas A. Hahn, Willowbrook; Thomas W. Mines, Orland Park, all of Ill.

[73] Assignee: Illinois Bell Telephone Company, Chicago, Ill.

[21] Appl. No.: 28,259

[22] Filed: Mar. 9, 1993

[51] Int. Cl.$^5$ ............................................. H04M 15/00
[52] U.S. Cl. ................................................ 379/1; 379/9; 379/13
[58] Field of Search ............... 379/9, 10, 1, 11, 12, 379/13, 14, 15, 34, 112, 114, 121, 133, 134

[56] References Cited

U.S. PATENT DOCUMENTS

| | | | |
|---|---|---|---|
| 4,393,491 | 7/1983 | Ashlock et al. | 379/15 X |
| 4,839,916 | 6/1989 | Fields et al. | 379/13 |
| 4,937,850 | 6/1990 | Borbas et al. | |
| 4,945,554 | 7/1990 | Krause et al. | 379/10 |
| 5,060,256 | 10/1991 | Borbas et al. | |
| 5,065,393 | 11/1991 | Sissitt et al. | 379/13 X |

Primary Examiner—Stephen Chin
Assistant Examiner—Paul Loomis
Attorney, Agent, or Firm—Willian Brinks Hofer Gilson & Lione

[57] ABSTRACT

An apparatus for verifying the central office billing translations from a remote location is disclosed. The system includes a processor with software which generates patterned telephone calls through a test set at the switch at a switching station to all working access codes. The billing information of these calls is then recorded. Once the recorded information is processed, the records which originated from the test set are identified by their assigned telephone number. These records are extracted and preferably recorded such that they can be automatically verified against an accurate routing and billing table for the specific site. The table is preferably stored in the test set.

14 Claims, 17 Drawing Sheets

PRO-ACTIVE BILLING AND ROUTING TEST SET

BACKGROUND OF THE INVENTION

A portion of the disclosure of the patent document contains material which is subject to copyright protection. The owner has no objection to the facsimile reproduction by any one of the patent disclosure, as it appears in the Patent and Trademark Office patent files or records, but otherwise reserves all copyright rights whatsoever.

The present invention relates generally to a system and apparatus for verifying central office routing transactions in a telephone communications network from a remote location, and more particularly to a system and apparatus for verifying central office billing and routing translations in a telephone communications network from a remote location.

Telephone communications networks often require that the carrier verify the office billing and routing of a telephone call. Verification is necessary not only to insure that the call will reach the appropriate destination, but also to insure proper billing. Improper routing of calls may be caused by translation or wiring errors, depending on the type of office. Verification of billing and routing is necessary, for example, before a new central office switch is cut into service either replacing an existing switch or establishing new service.

A system for verifying the routing of a telephone call is disclosed in U.S. Pat. No. 4,937,850 (Borbas et al.) commonly assigned with the present application. U.S. Pat. No. 4,937,850 is incorporated herein by reference. The system disclosed in this patent, however, does not provide any means for verifying the billing translations. Translations are a highly complex set of instructions that define billing and other switching functions based on class of service, access codes, and other settings that are unique to each office or switching station. Classes of service are, for example, POTS (Plain Old Telephone Service), Business, Hotel/Motel, Coin, PBX (Plant Board Extension). There are many thousands of such translations and each group of translations is subject to frequent revisions and changes. As a result, the possibility of errors in the billing is quite large. The magnitude of the translations in error may range from inconsequential to extremely costly.

In the past, telephone companies have depended on customer billing complaints to identify translation billing problems. Unfortunately, customers are much less apt to complain about calls that they should have been billed for and weren't than the reverse. In addition, recently, billing complaints are being registered by long distance carriers that may involve many thousands of calls. Telephone companies in the past have been ill equipped to respond to such complaints since there is no easy and reliable way to check the translations. In the past, the verification process has consisted of manual dialing of each access code, by individual class of service, followed by the line-by-line checking of the billing output. This verification process is extremely time-consuming and error prone.

Therefore, it would be desirable to develop a system which eliminates the hours of tedious and tiresome manual effort of the presently used methods and offers and accurate gauge to refute billing complaints from long distance carriers and other users. It would also be desirable to provide a system with these capabilities which is relatively inexpensive and which has the capacity to check a large number of lines from a central office. It would also be desirable that the system have the capability of checking or verifying the billing and routing from a remote location.

Therefore in view of the above, it is a primary object of the present invention to provide a system and apparatus for automatically verifying central office billing and routing translations It is a further object of the present invention to provide a system and apparatus for automatically verifying billing and routing translations at a central office from a remote location.

SUMMARY OF THE INVENTION

To achieve these and other objects, the present invention provides an apparatus for verifying the central office billing translations from a remote centralized test location. The system includes a processor at a central location with software which generates patterned telephone calls through a test set at the switch at a switching station to all working access codes. The test set identifies and reports successful call completions. The billing information of these successful calls is then recorded and stored in a file. Once the recorded information is processed, the records which originated from the test set are identified by their assigned telephone number. These records are extracted and preferably recorded such that they can be verified against an accurate routing and billing table for the specific site. The table is preferably stored in a computer at the centralized test location.

This system and apparatus provides an inexpensive system which eliminates the hours of tedious and tiresome manual effort presently used to verify the billing data.

DETAILED DESCRIPTION OF THE PRESENTLY PREFERRED EMBODIMENTS

Figure 1:
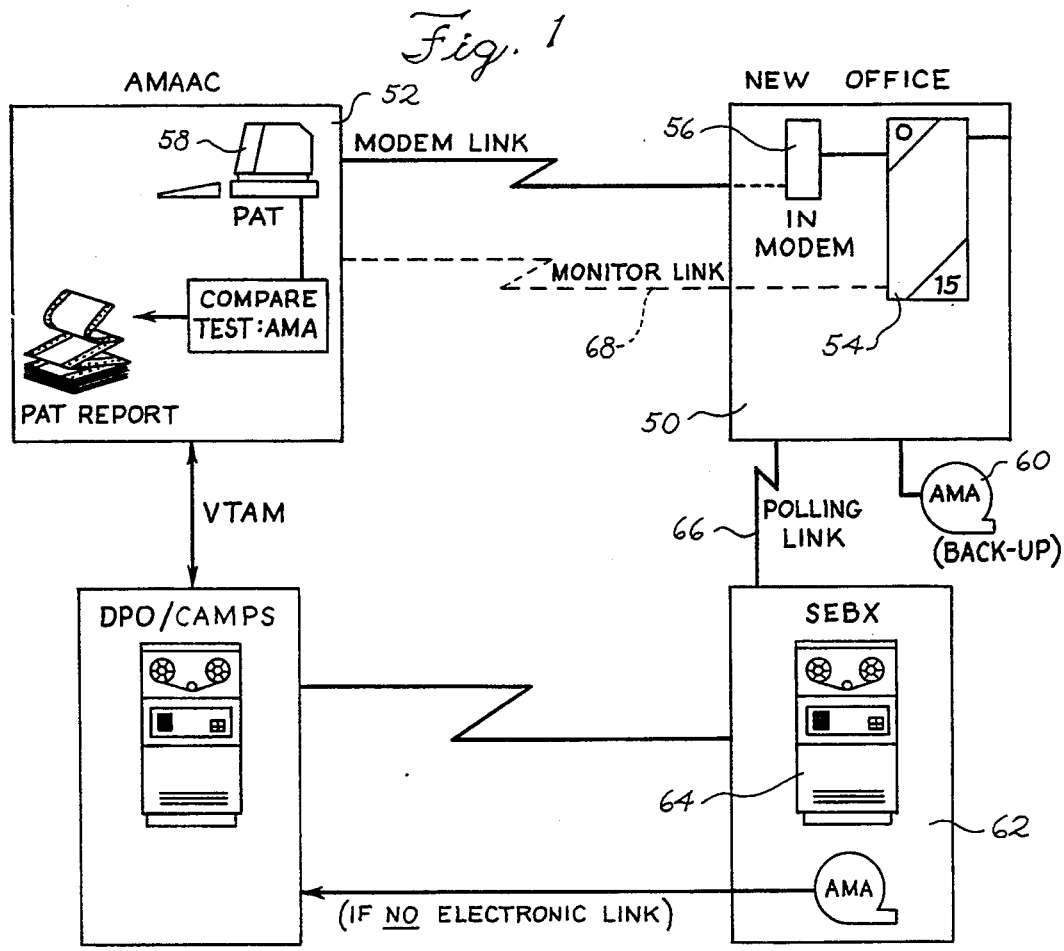
FIG. 1 is a schematic representation of a preferred embodiment of the present invention.

FIG. 1 illustrates a schematic illustration in block diagram form of a preferred embodiment of the present invention. A test set 54 is located in a central office 50. The test set 54 is connected via a modem 56 to a computer 58 located at a separate testing location 52. The test set 54 includes a 16-line switch card which connects the common line circuit to the line from which the call is to be placed. The test set 54 is preferably equipped with eight of these cards for a total of 128 lines which may be tested. The 128 test lines provide access to the various classes of service which can be translated to charge differently for the same call. The test set 54 accepts a command to connect the common line circuit to the proper test line. The test set 54 also includes a line monitor card, discussed in more detail below, which is connected to a telephone via a monitor link 68 so that the user can monitor the tests being performed by the system. The test set 54 is configured such that the report of the test results (i.e., successful call completions) is stored in a pass or fail file for further action. The test set 54 is programmed to accept a variable length string of digits which are to be dialed plus a test code. This variable length string of digits comprises the test number and the type of test which is to be performed.

Figure 2:
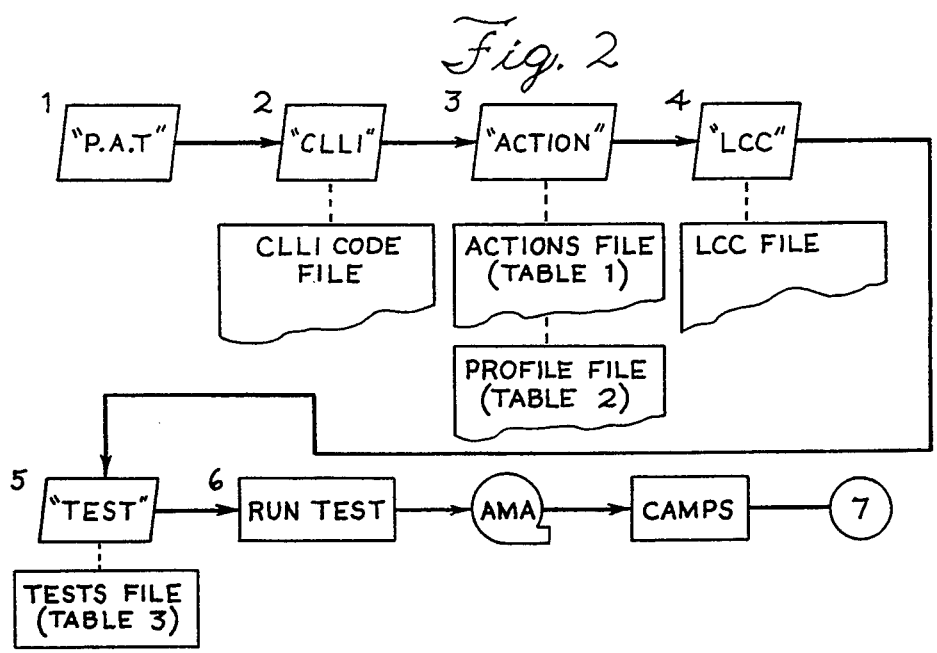
FIGS. 2 and 3 are flow-charts illustrating a preferred embodiment of the process of the present invention.
Figure 3:
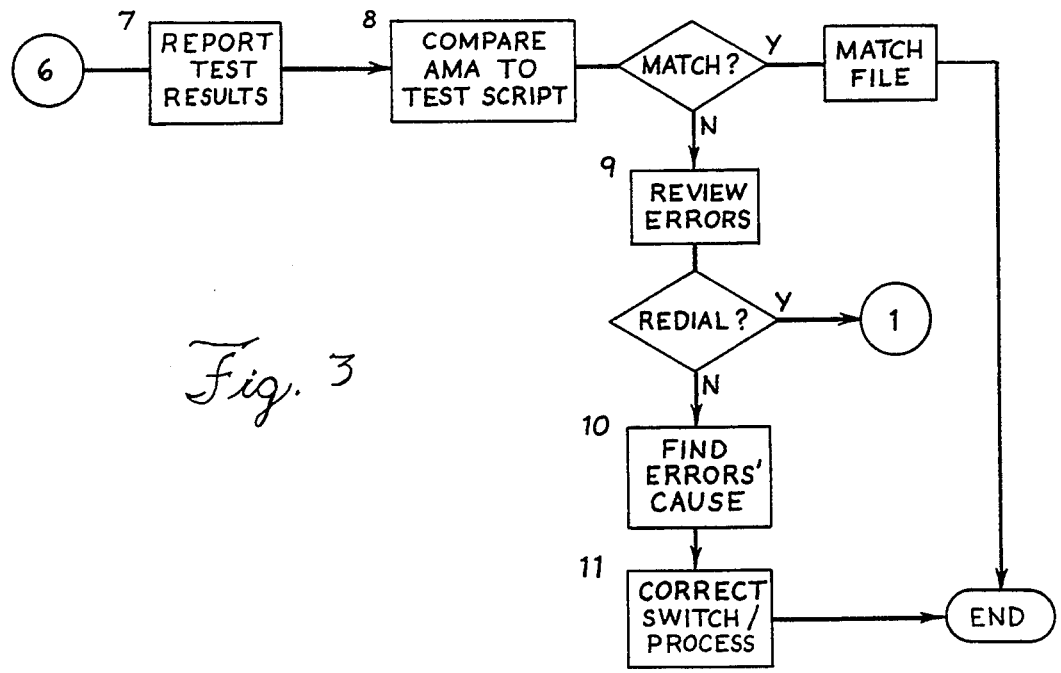

The preferred embodiment of telephone transaction testing system of the present invention uses the series of steps which are outlined with flowcharts illustrates in FIGS. 2 and 3. The pro-action record processing (AMA) testing program (PAT) accesses a code which is used to identify the switch from which the call is to originate. This code is referred to as the Common Language Location Identifier (CLLI) code. The program then determines what type of action is to be taken using the action file (TABLE 1) and the Profile file (TABLE 2). Table 2 provides an example of an office profile data. The data includes: (1) the office CLLI code; (2) the switch type which tells the user what switch vendor is provided in the office under test; (3) the local access tandem area (LATA) test lines—a first test line which is the in-modem port which the user connects to from the personal computer 58, and a second test line which is the monitor port which allows the user to listen to actual calls as the process is executed; and (4) the office equipment for two test lines.

The program then uses a file which is used to determine what type of line the billing is to be generated for, i.e., what class of service. This code is called the line class code (LCC). The program then accesses a tests file (TABLE 3) which contains the tests which may be preformed by the test set. A detailed listing of the software for implementing the flowcharts of FIGS. 2 and 3 is provided in Appendix A.

TABLE 1

| ACTION | DESCRIPTION |
| --- | --- |
| AMA | Record Processing |
| DTT | Dial Tone Test |
| LIST | Failures to Screen |
| LCC | Print All LCCs |
| PRINT | Failures to Printer |
| PROFILE | Office Description |
| REDIAL | Retest Failures |
| STATUS | Of Test |
| TEST | Make test calls |
| VIEW | Look at a log file |

TABLE 2

| FIELD | DATA |
| --- | --- |
| OFFICE CLLI CODE | ALGNILAQDSO |
| SWITCH TYPE | EWSD |
| LATA # | 358 |
| TEST LINE(S) | 10 DIGIT TN |
| OFC EQPT. | LINE EQPT # |

TABLE 3

| Test # | Dial Pattern |
| --- | --- |
| 01 | 0- |
| 02 | 0 + HOME NPA + 7 Digits |

TABLE 3-continued

| Test # | Dial Pattern |
| --- | --- |
| 03 | 0 + 7D (INTERLATA) |
| 04 | 0 + 7D (INTRALATA) |
| 05 | INTRAOFFICE |
| 06 | 7D (INTRALATA) |
| 07 | 7D (INTERLATA) |
| 08 | 1 + 7D (INTRALATA) |
| 09 | 1 + 10D (INTRAS/INTRA) |
| 10 | 1 + 10D (INTRAST/INTER) |
| 11 | 1 + 10D (INTERST/INTRA) |
| 12 | 1 + 10D (INTER/INTER) |
| 13 | 1 + 800 |
| 14 | 1 + 800-555-1212 |
| 15 | (Reserved) |
| 16 | (Reserved) |
| 17 | 1 + 700 |
| 18 | 00- |
| 19 | 950-NNNN |
| 20 | 01 + (IDDD) |
| 21 | 011 + (IOTC) |
| 22 | 411 |
| 23 | 555-1212 |
| 24 | 911 |
| 25 | 611 |
| 26 | 976-NNNN (MASS CALL) |
| 27 | 796-9600 (CNA) |
| 28 | 10XXX + 0- |
| 29 | 10XXX + 00- |
| 30 | 10XXX + 7D (INTRALATA) |
| 31 | 10XXX + 10D (TRA/TRA) |
| 32 | 10XXX + 10D (TRA/TER) |
| 33 | 10XXX + 10D (TER/TRA) |
| 34 | 10XXX + 10D (TER/TER) |
| 35 | 10XXX + 1 + 800 + 7D |
| 36 | 10XXX + 1 + 700 + 7D |
| 37 | 10XXX + 01 (IDDD) |
| 38 | 10XXX + 011 (IOTC) |
| 39 | 10XXX + # |
| 50 | ALL 7D INTRALATA |
| 51 | ALL 10D INTRALATA |
| 52 | ALL 10D INTERLATA |
| 53 | ALL 800 NPAs |
| 97 | All codes in a CLLI |
| 98 | 'Special.TN' File |
| 99 | User Spec'd TN |

In order for the circuit to verify the proper response to the test set 54, the test set 54 incorporates a tone detection system for all call progress as well as for 1004 Hz tone. The test set 54 therefore will monitor any and all of the following conditions: (1) 500 ms of 1004 Hz tone alone within a ten-second period; (2) 500 ms of 480 Hz tone alone within a ten-second period; and (3) 500 ms of 480 Hz tone after approximately 15 burst of a busy tone.

The calls that were made for the test create billing records. These records are then written to tape (60) at the central office or are polled via the polling link (66) by the polling processor or polling host (64) located at a remote location (6). The data, either on a storage media such as a storage tape or polled at the polling host 64 is then sent to the data processing office (DPO) for billing. The test calls are extracted from the tape and inputted into the host computer 58 for billing comparison with the test data stored in tables in the memory of the host computer 58.

The test set 54 includes four major components which are described in more detail below and illustrated in FIGS. 4-8. The first major component comprises a CPU card 70 illustrated in FIG. 4. The CPU card 70 includes a microprocessor U1 which may be, for example, a Dallas microprocessor stik Model No. DS2244T. This stik includes an integral modem which is used to send and receive data from the remote terminal 52. The modem may operate at conventional baud rates such as 2400, 1200, and 300. The stik further includes a dual tone multi-frequency (DTMF) decoder. The stik also includes a 32K×8 non-volatile static RAM memory storage area that is powered, for example, by an internal lithium battery.

Twenty-four (24) I/O pins are provided for controlling various portions of the circuitry. The CPU card 70 also includes two data access arrangement (DAA) stiks U3 and U4 suitable DAAs are commercially available from Dallas Semiconductor as Model No. DS2249. These two DAAs U3 and U4 provide for a direct connection to the switched telephone lines. These two DAAs U3 and U4 are used for the two to four wire conversion, ring detection and audio output. The DAA stik U4 is the line interface stik used by the internal modem. The DAA stik U3 is used for interfacing the incoming/outgoing message from the speech stik and to receive the audio tones for processing.

A speech stik U2, such as a Dallas speech stik Model No. DS2271 provides for a solid state audio recording and play back system for the purpose of sending an announcement to the called number. Speech stik U2 has the ability to record a message of up to seven seconds in length through either the telephone line or an external audio jack J2 and if requested by the CPU can also play back the message on demand.

A serial shift register/driver U19 is used to drive four indicating LED's, a test line off-hook diode D2, a modem carrier detect diode D3, a record/playback of message diode D4, and a modem off-hook diode D5. The serial shift register/driver U19 is also used as a buffer/driver to access one of the eight input/output (I/O) line cards in test set 52. A suitable shift register/driver is available from National Semiconductor as Model No. ICMM548.

The CPU card 70 also includes a zero crossing detector U6 which converts an analog sine wave tone (such as a 1004 Hz Tone) into stable fast rise and fall time pulses which can then be processed by the CPU. Also included is a detector U5 for detecting dual tones. A suitable detector U5 is a Teletone M-982.

A signal convertor U8 is used to convert the logic signals from the CPU into an RS232C signal for communicating with an external computer. A suitable signal convertor is available from Linear Technology as Model No. LT1281CN.

Circuitry comprising input AND gates U16:A, U16:B, and U16:D is used to provide enable signals for proper control of the serial data.

An opto-coupler U14 (such as a 4N33 Opto Coupler) is used to provide a means for detecting a reversal of the tip and ring lines.

power to the CPU card 70 is provided at +12 V and is regulated down to +5 V by regulator U12. The regulator U12 supplies all of the voltage for the logic circuits with bypassing provided by capacitors C6 and C7. An additional +5 V current supply, commonly referred to as VDD is provided by a regulator U11 and capacitor C1. A suitable regulator is a National Semiconductor LM7805 Regulator. VDD provides an independent noise free supply for the analog portion of the circuitry. A third supply which consists of a charge pump circuit U7 and capacitors C8 and C9 converts the +12 V into negative 10 V voltage (−10 V). The −10 V is then further regulated down to −5 V, bypassed by capacitor C9, to provide a clean negative voltage source for the analog circuitry at −5 V.

In a configuration with 128 possible lines, one of these lines is selected by having the CPU send the appropriate data to hex digit driver U19 in order to enable one of the eight I/O cards. The actual line desired from each of the I/0 cards is addressed serially by sending synchronous clock and data pulses which are generated by the CPU and buffered by invertors U15:C and U15:E.

A return signal from the I/O cards is buffered by invertor U15:S and NAND gate U16:C and is sent to the CPU for handshaking purposes. Once the line has been selected, it is connected to DAA stik U3 via a back plane bus. If the polarity of the line is correct, diode D1 will connect and turn on OPTO-Coupler-U14, which will send a +5 V signal to invertor U15:A. The +5 U signal is inverted, buffered and shaped and is sent to the CPU for interrogation. The DAA stik U3 sends an audio signal through an inverting op-amp which is comprised of resistor R5, amplifier U17:B and resistor R4. The audio signal then goes through one of the two tone detector circuits to a summing amplifier U17:D.

If a single audio sine wave tone is received, detector U6 is used to convert this tone signal into logic pulses. The tone is coupled to detector U6 through resistor R14. Detector U6 functions as a variable hysteresis zero crossing detector by sensing the peak-to-peak amplitude of the tone, and charging up capacitor C15 to half of the peak voltage. This voltage is the trigger point of the internal comparator of detector U6. Thus, when the sine wave exceeds half of the peak voltage, it switches states. Once detector U6 switches, it also changes its trigger point internally from half of the peak voltage to zero. The sine wave must then go through zero in order to switch states again. This method of detection provides a very high degree of noise immunity and allows for very precise measurements.

Resistor R16 and capacitor C16 form a simple R/C network for detector U6 to generate a fixed pulse width. Resistor R21 is used to bias the peak capacitor C15 to a preset level to allow for a minimum detection level if desired.

For dual tone detection, a call progress tone detector, such as one available from Teletone as M-982 is used. This integrated circuit will detect one of four single or dual tones: 480 Hz; 440 Hz; 620 Hz; and 350 Hz. When one of these tones are received, the appropriate output pins will be true and are ready to be further processed by the CPU.

Figure 5:
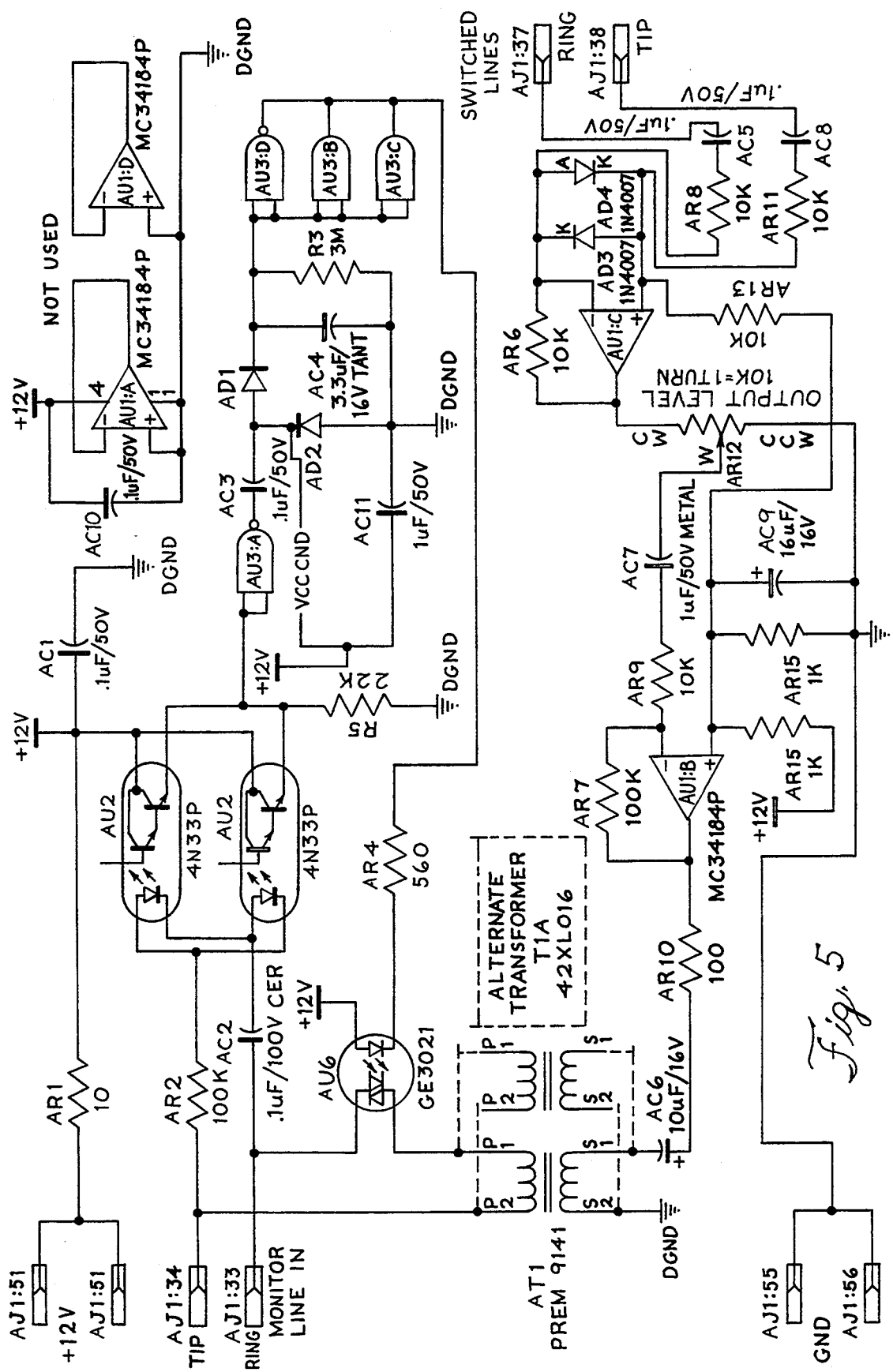
FIG. 5 is a preferred embodiment of the monitor card used in the test set of the present invention.

Referring now to FIG. 5, a preferred embodiment of the monitor card 80 used in the test set 54 is illustrated. The monitor card 80 allows the person making the test call from the remote location 52 to "listen-in" on the calls as they are placed. This feature may be used to verify the failures after the tests have been made. When a call is placed to the monitor card 80, opto-isolators AU2 and AU4 detect the ring which starts the timing circuit. The timing circuit consists of NAND gate AU3, capacitor AC3, diodes AD1 and AD2, capacitor AC4 and resistor AR3. During the first ring, the timing circuit operates opto-SCR AU6 which takes the line off-hook. The audio signal from the switched line is amplified by amplifier AU1:B and AU1:C and coupled to the monitor line by transformer AT1. The line will remain in the off-hook or monitor condition until the tester disconnects from the remote end 52.

Figure 6A:
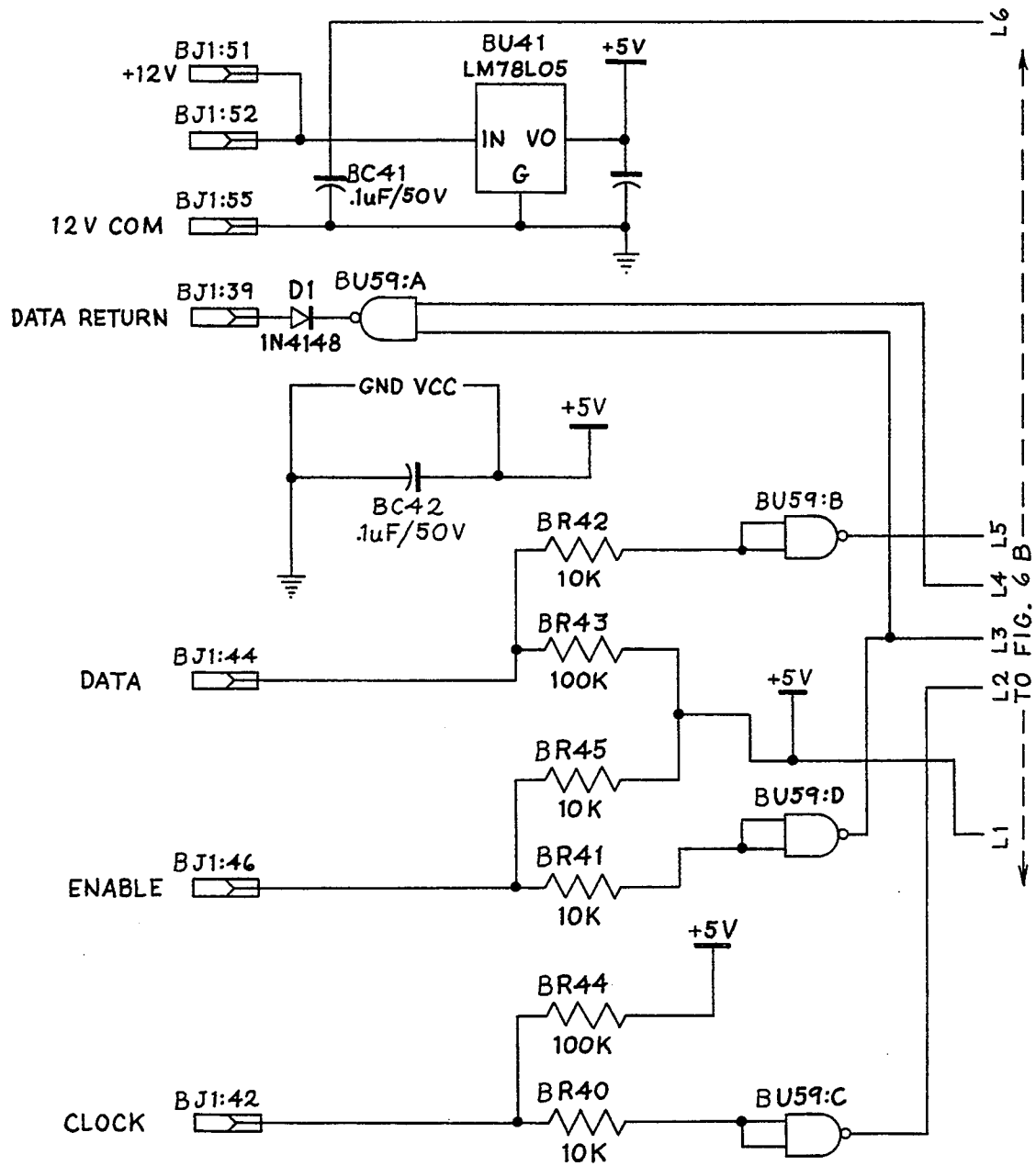
FIG. 6A-6B is a preferred embodiment of a telephone interface board used in the test set of the present invention.
Figure 6B:
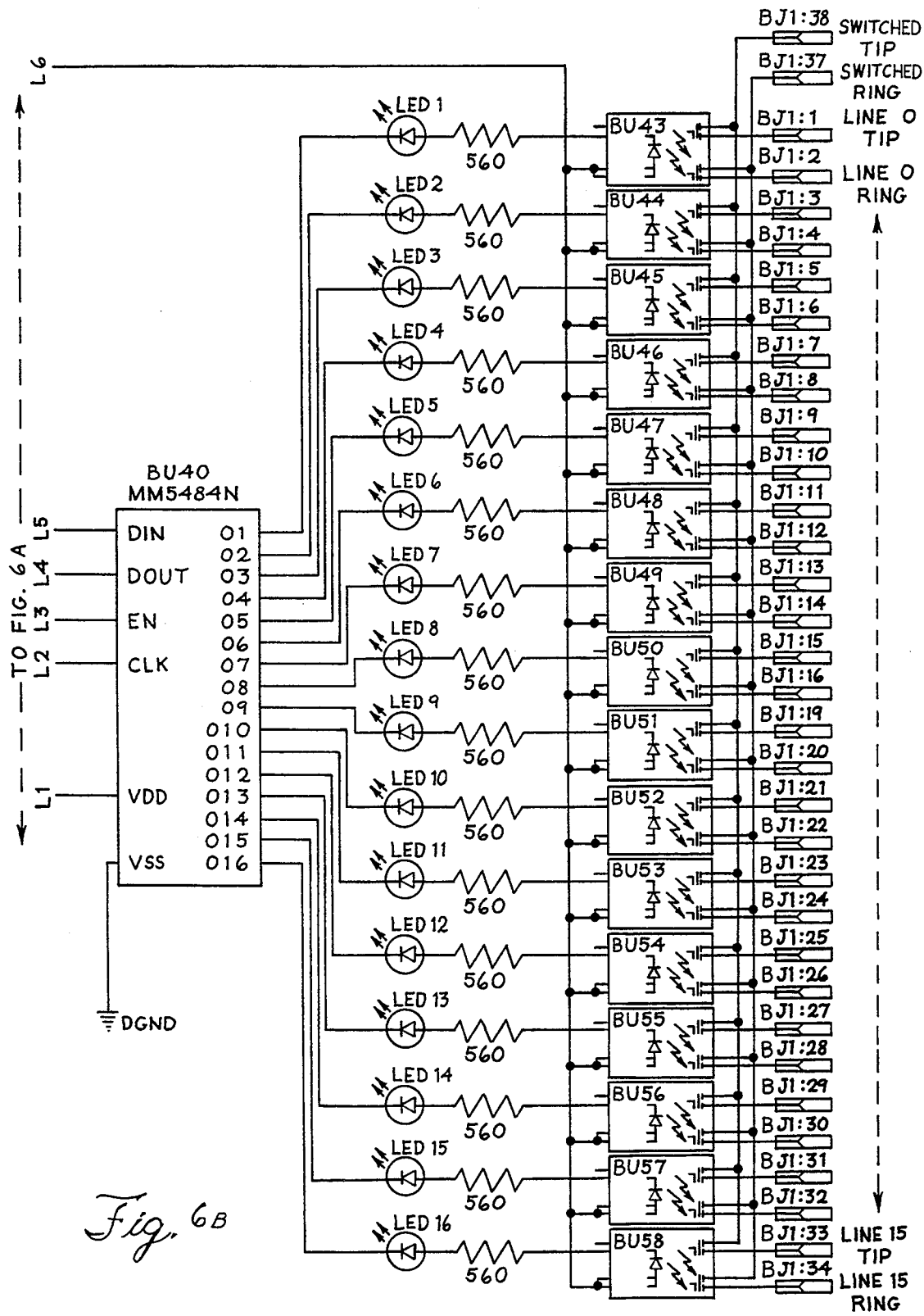
Figure 8A:
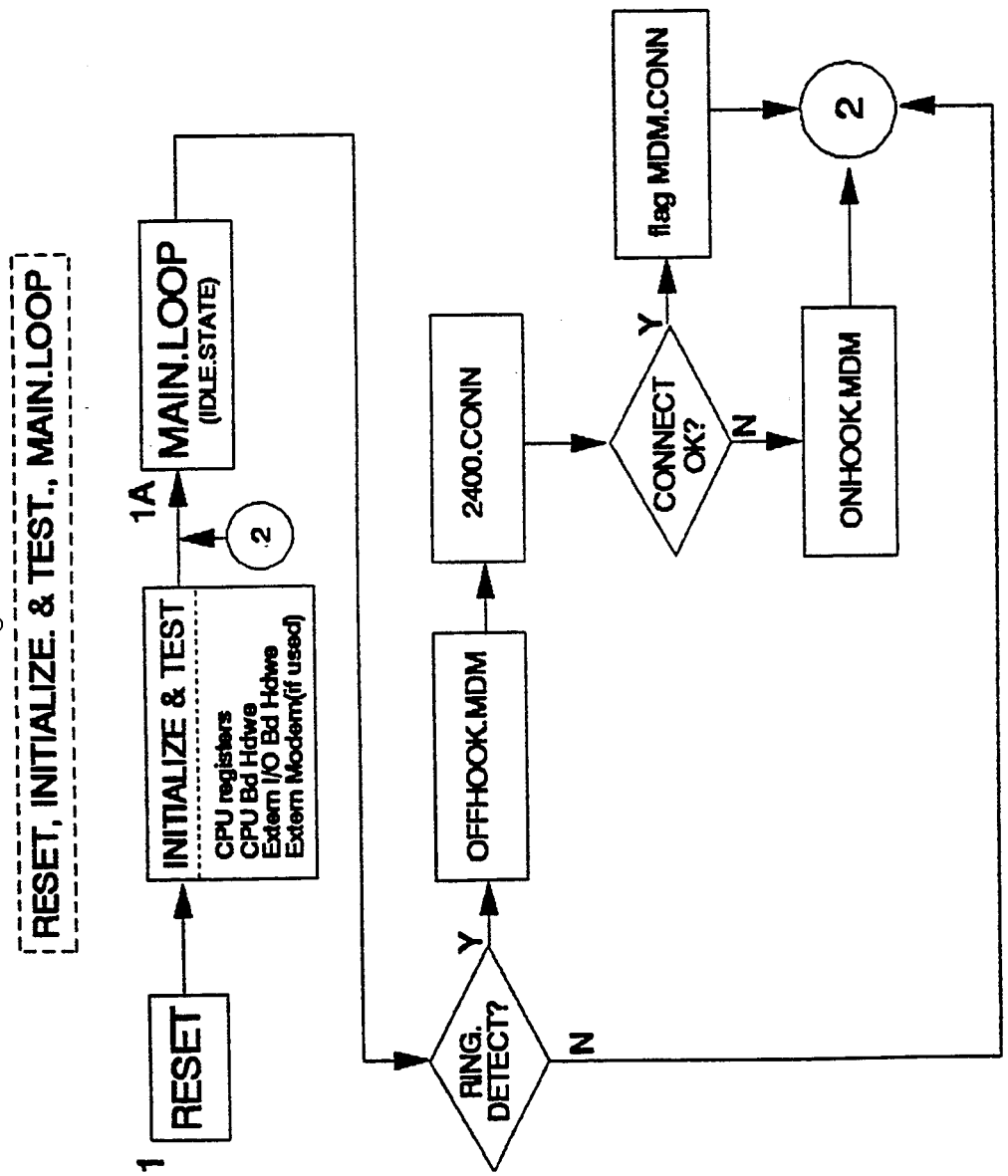
FIGS. 8A-8H illustrate a preferred embodiment in flow-chart form for the firmware used for the test set of the present invention.
Figure 8B:
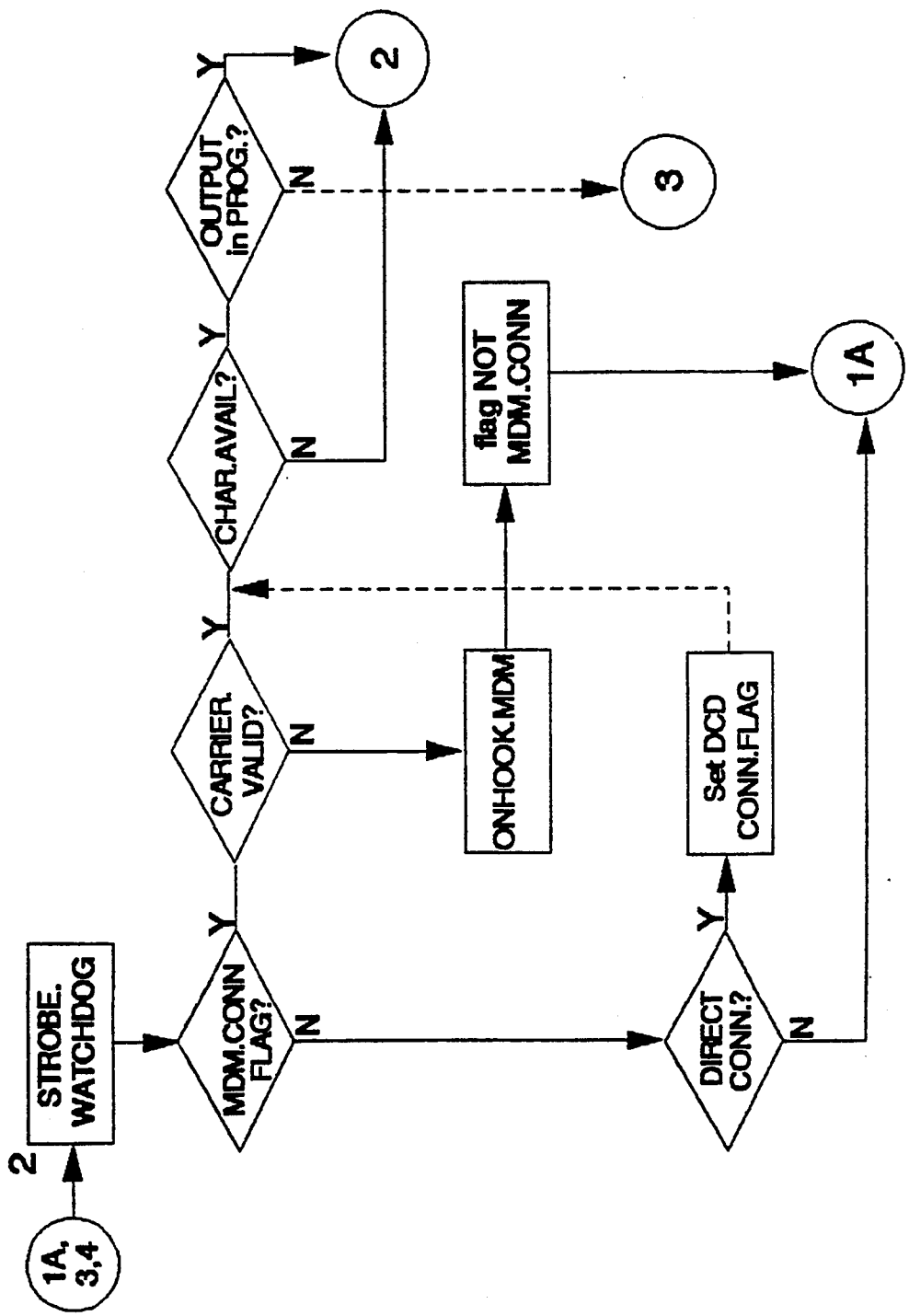
Figure 8C:
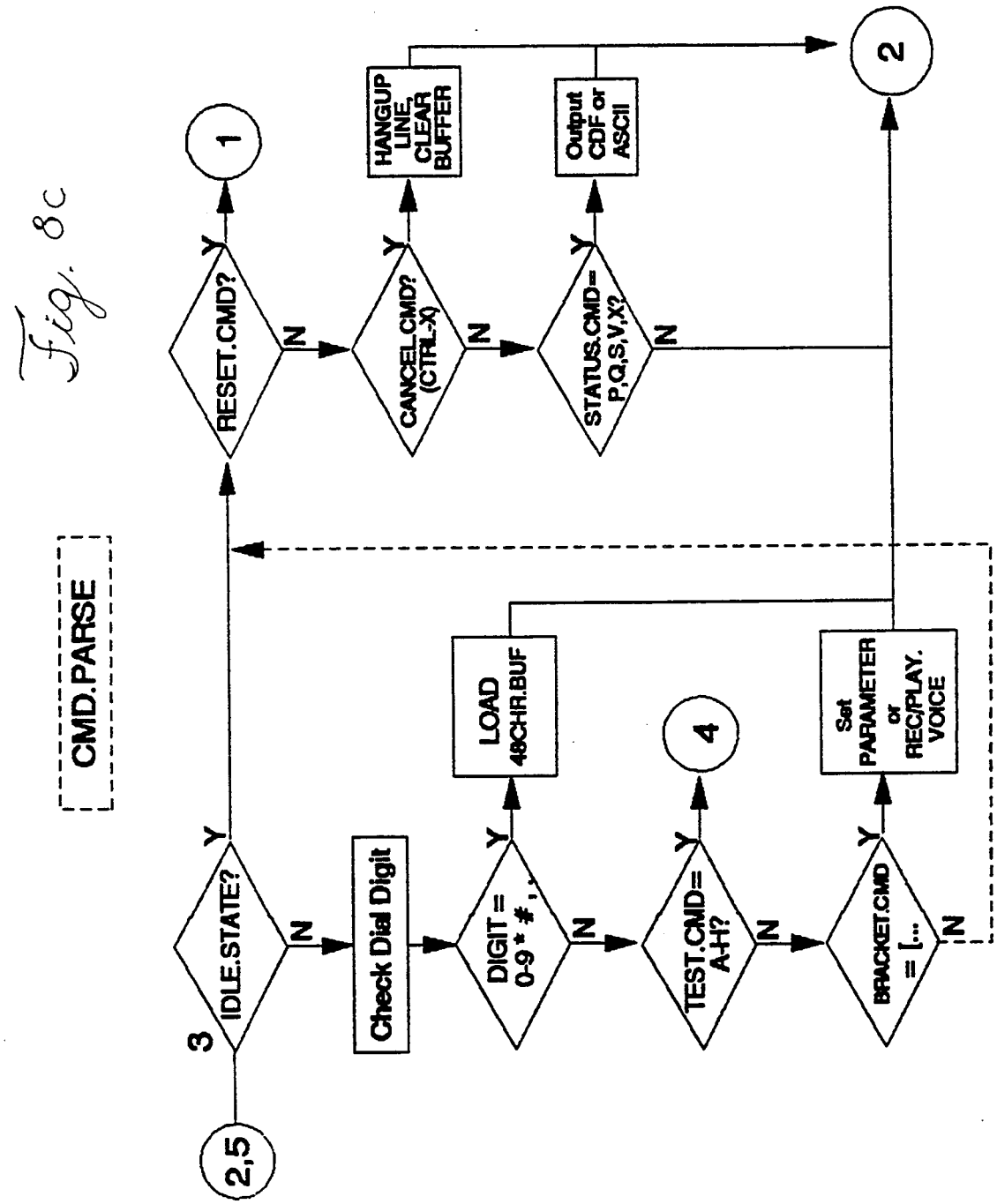
Figure 8D:
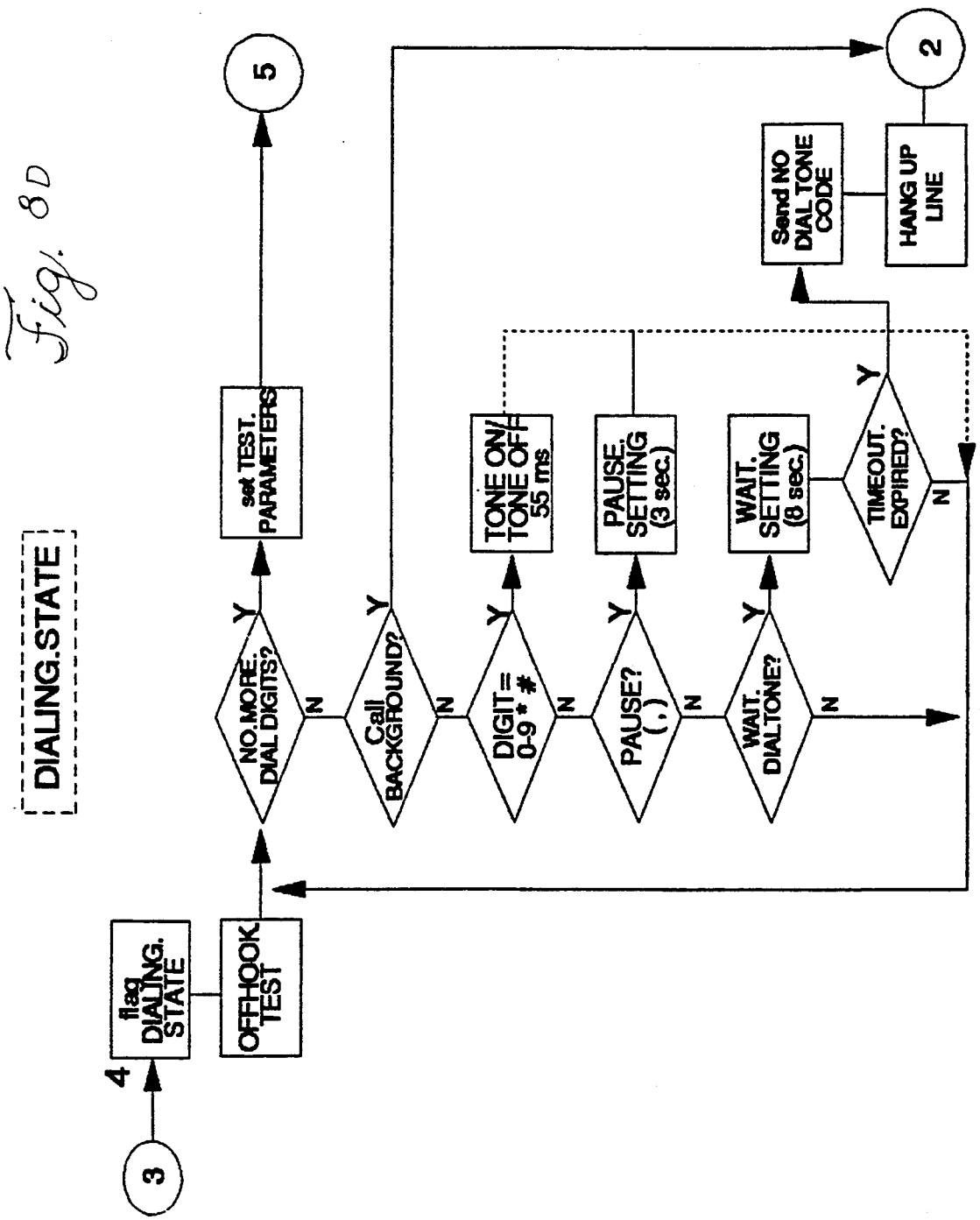
Figure 8E:
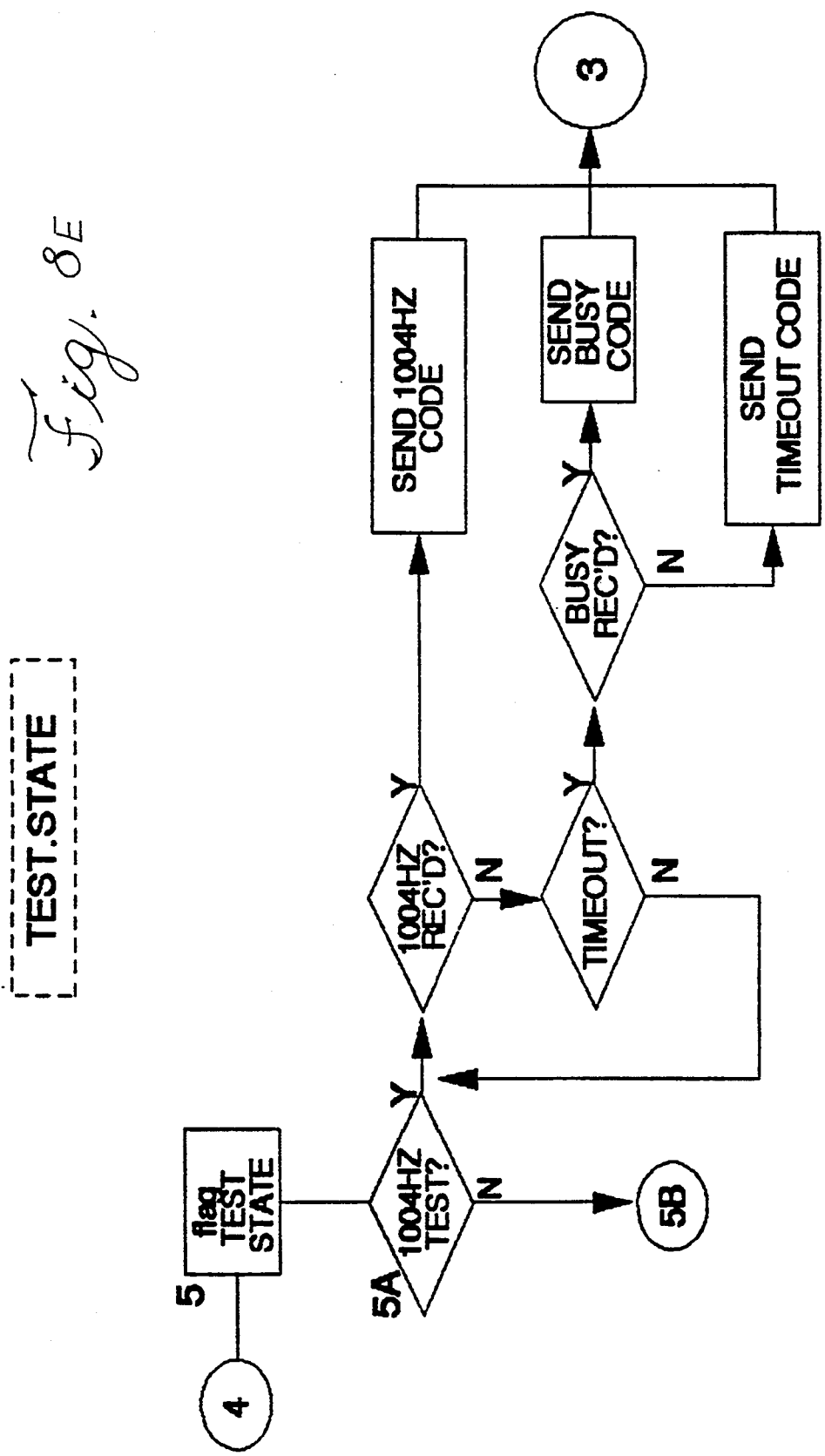
Figure 8F:
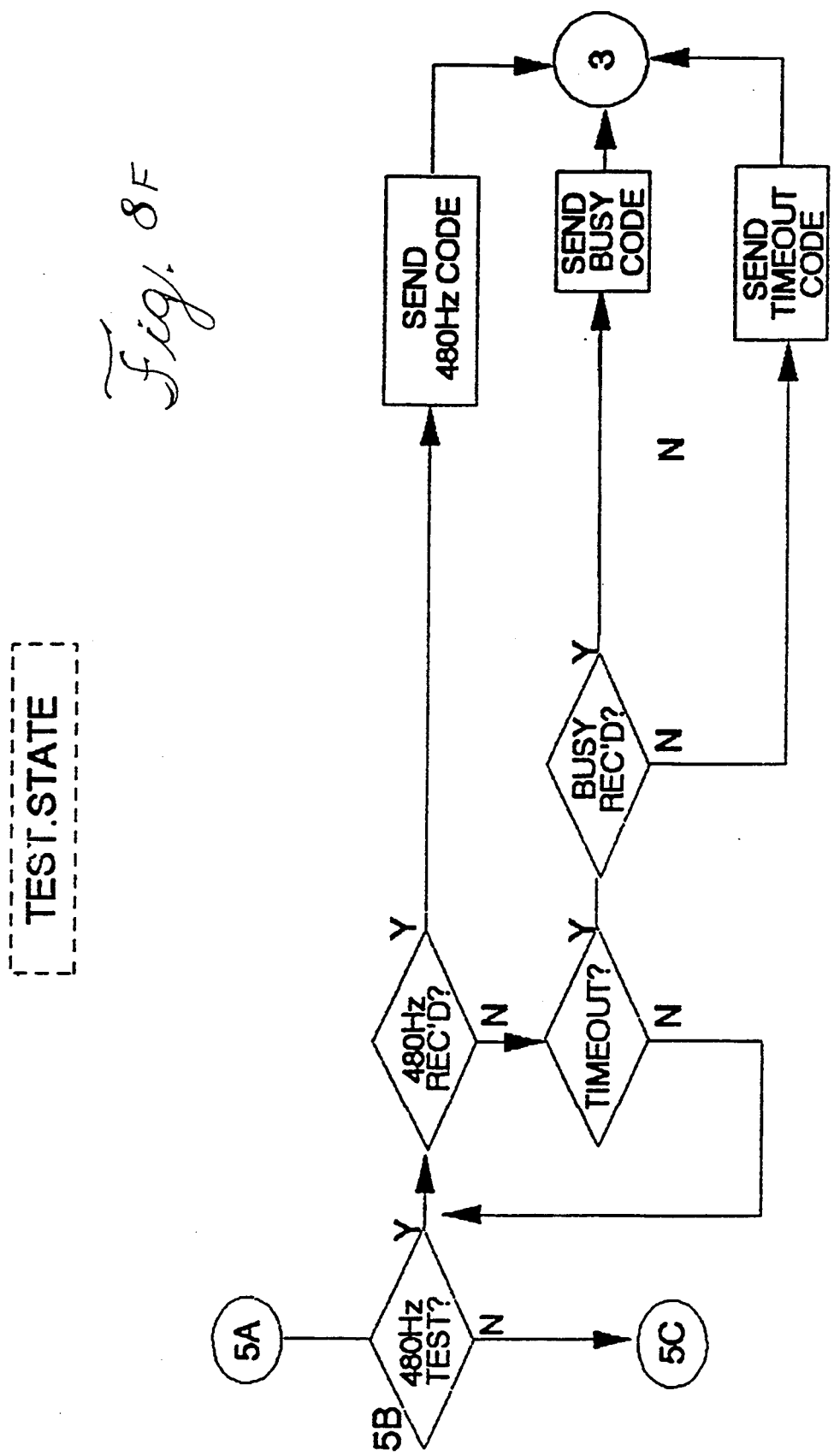
Figure 8G:
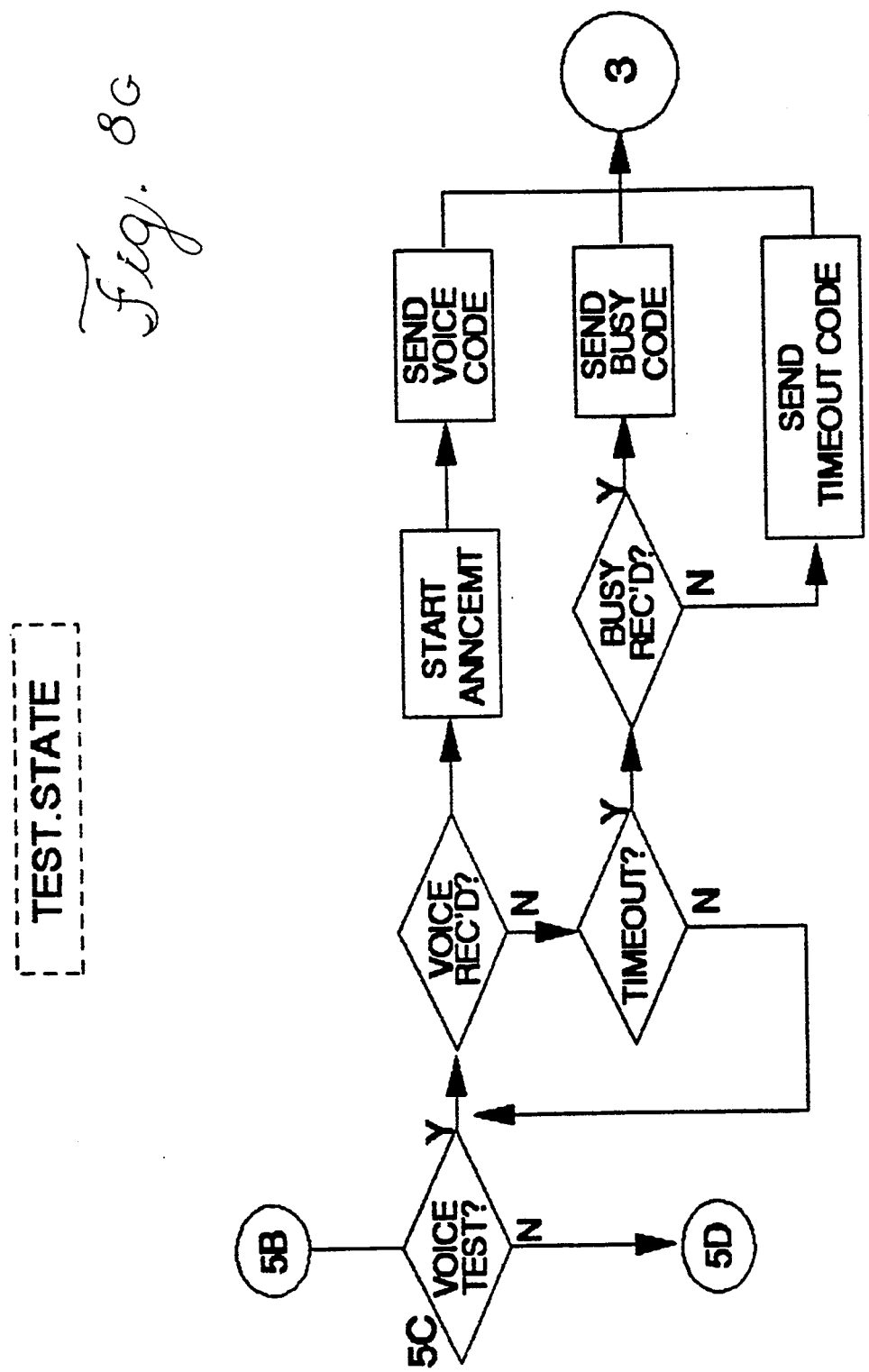
Figure 8H:
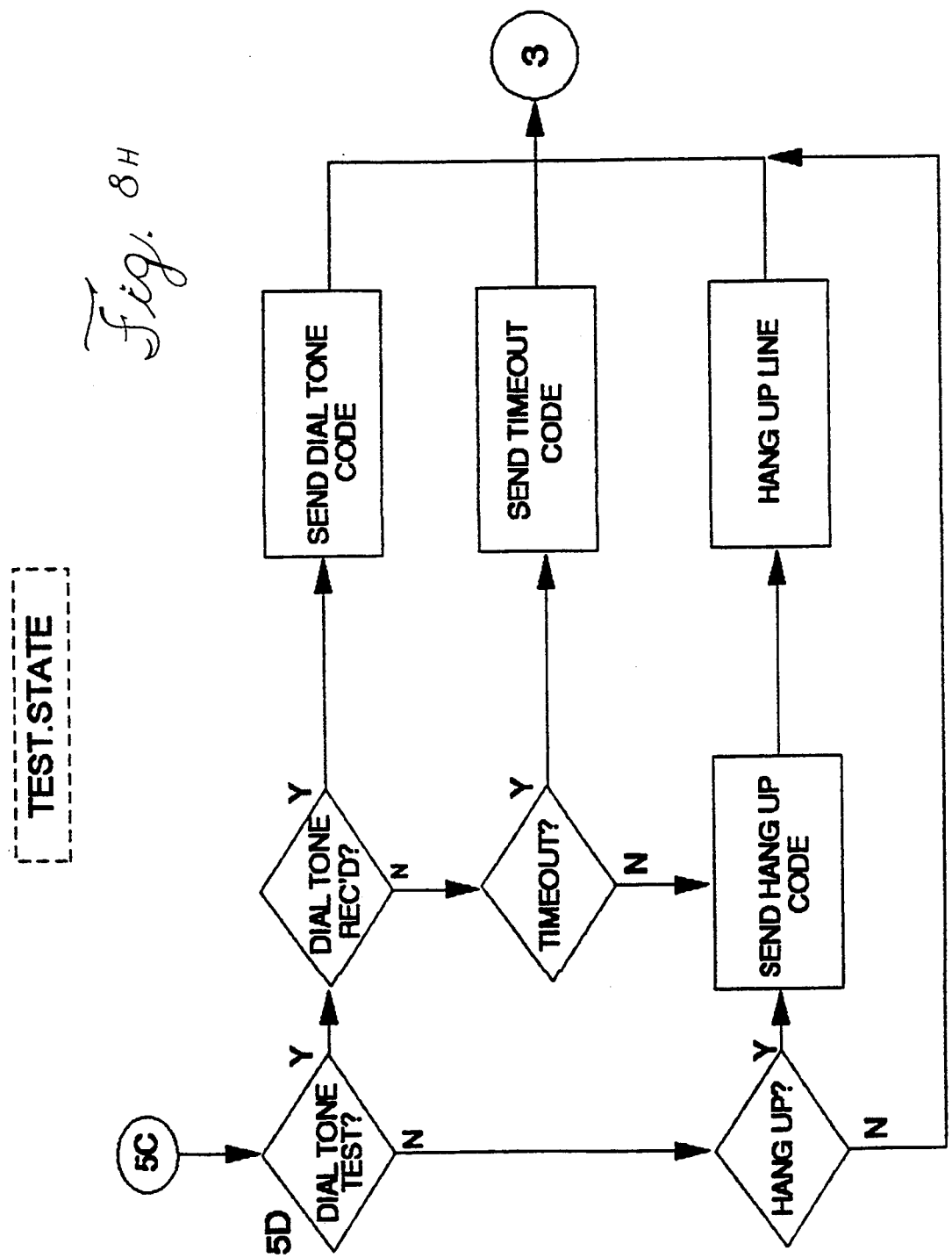

Referring now to FIGS. 6A-6B, a line telephone interface board 90 is illustrated. The line telephone interface board connects to one of sixteen individual telephone lines to the common line circuit on the CPU card 70. The enabled data and clock signal are received from the CPU card 70 through NAND gate BU59 which functions as an inverter buffer. A driver latch BU48 takes the count from the data lead which is clocked by the clock lead and latches the corresponding output. The output in turn operates one of the sixteen solid state relays BU43-BU58. These relays BU43-BU58 connect one of the sixteen telephone lines to the con, non bus leads to the line circuit on the CPU board 70. LED 1 through LED 16 indicate which line is connected.

Figure 7:
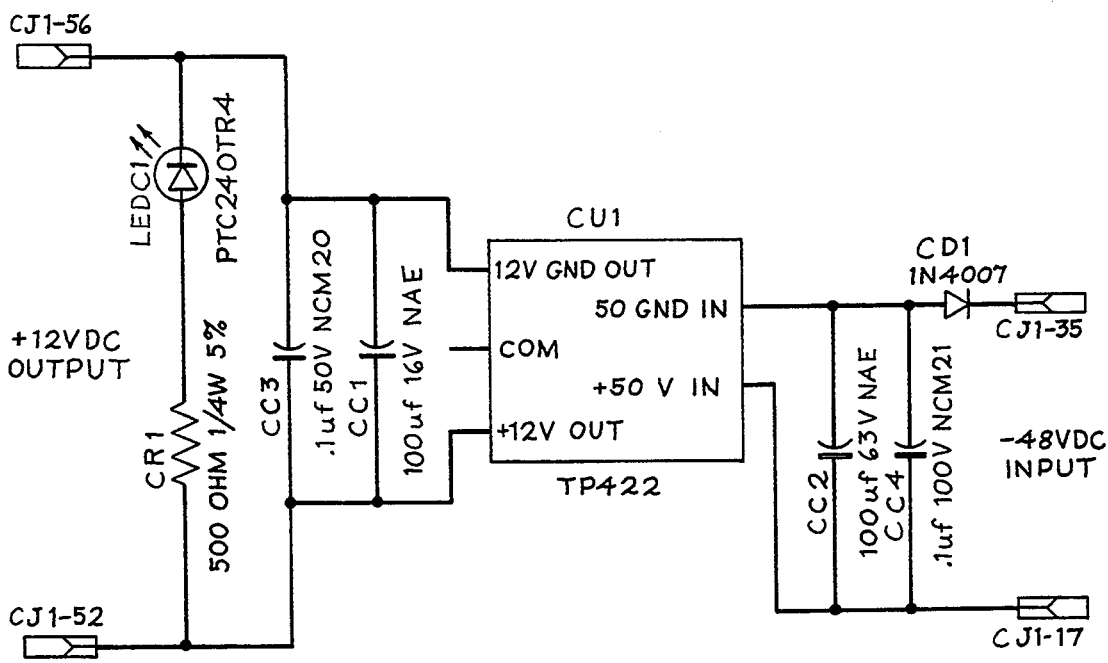
FIG. 7 is a preferred embodiment of the power supply board used in the test set of the present invention.
Figure 4A:
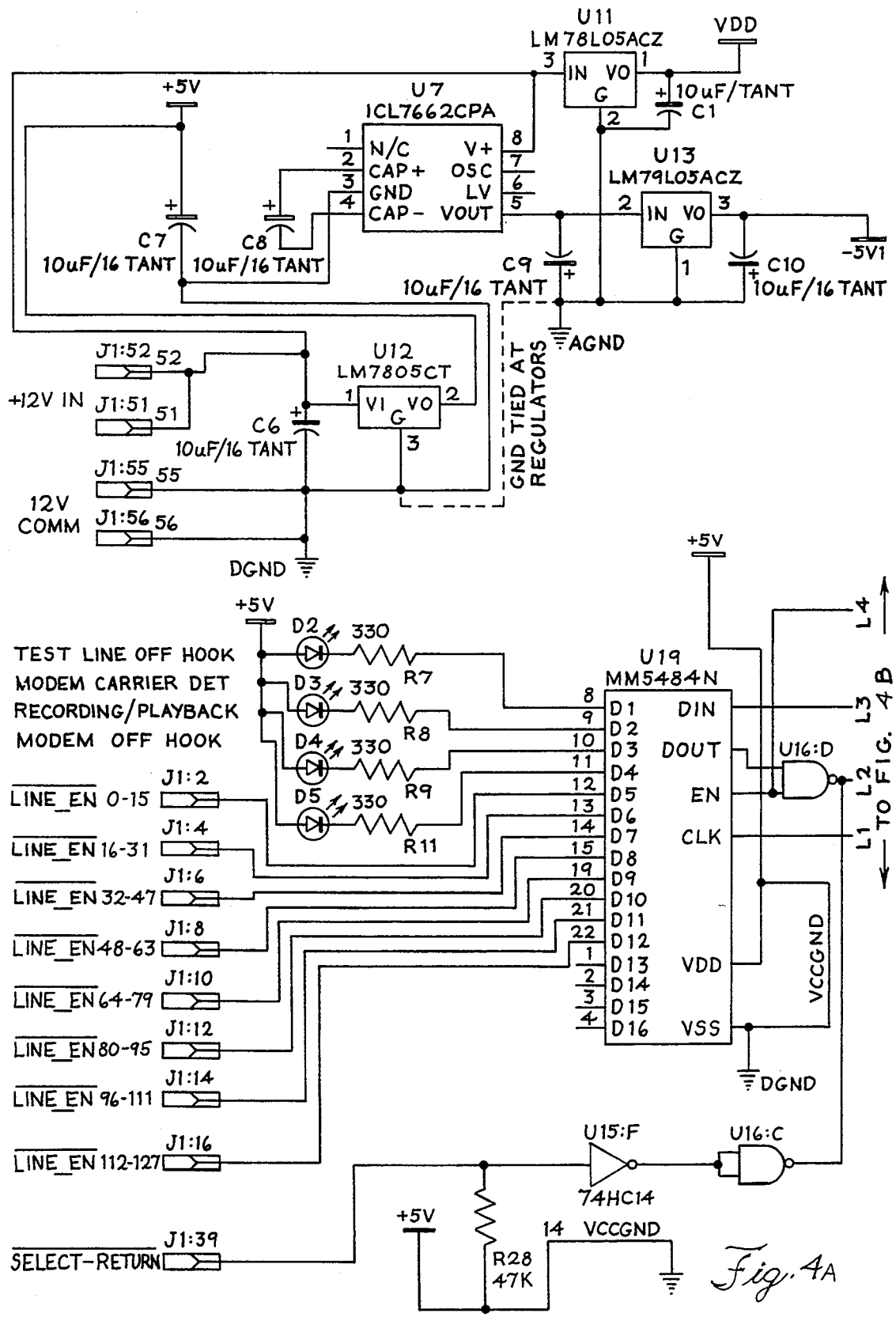
FIGS. 4A-4D illustrate a preferred embodiment of the CPU card used in the test set of the present invention.
Figure 4B:
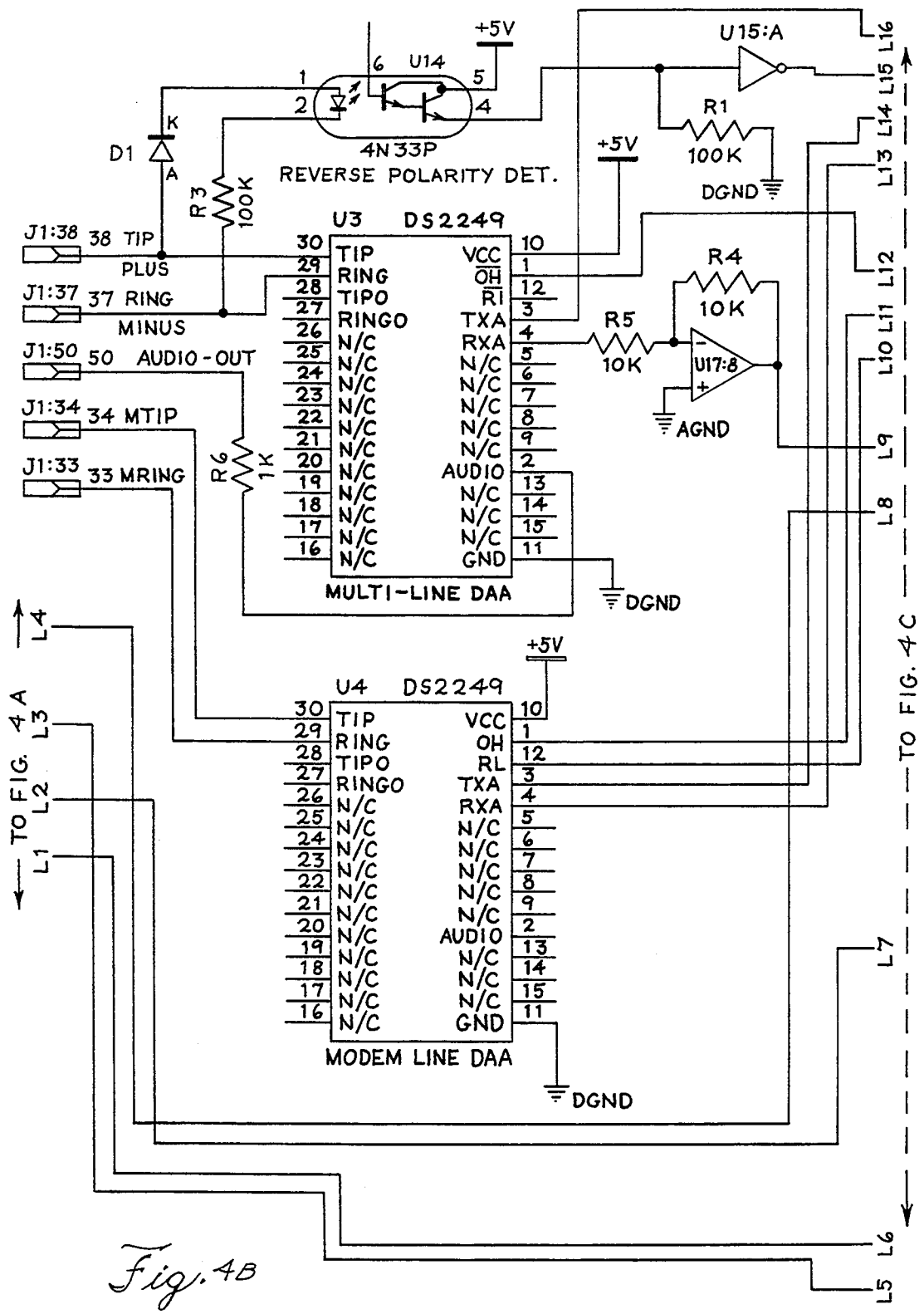
Figure 4C:
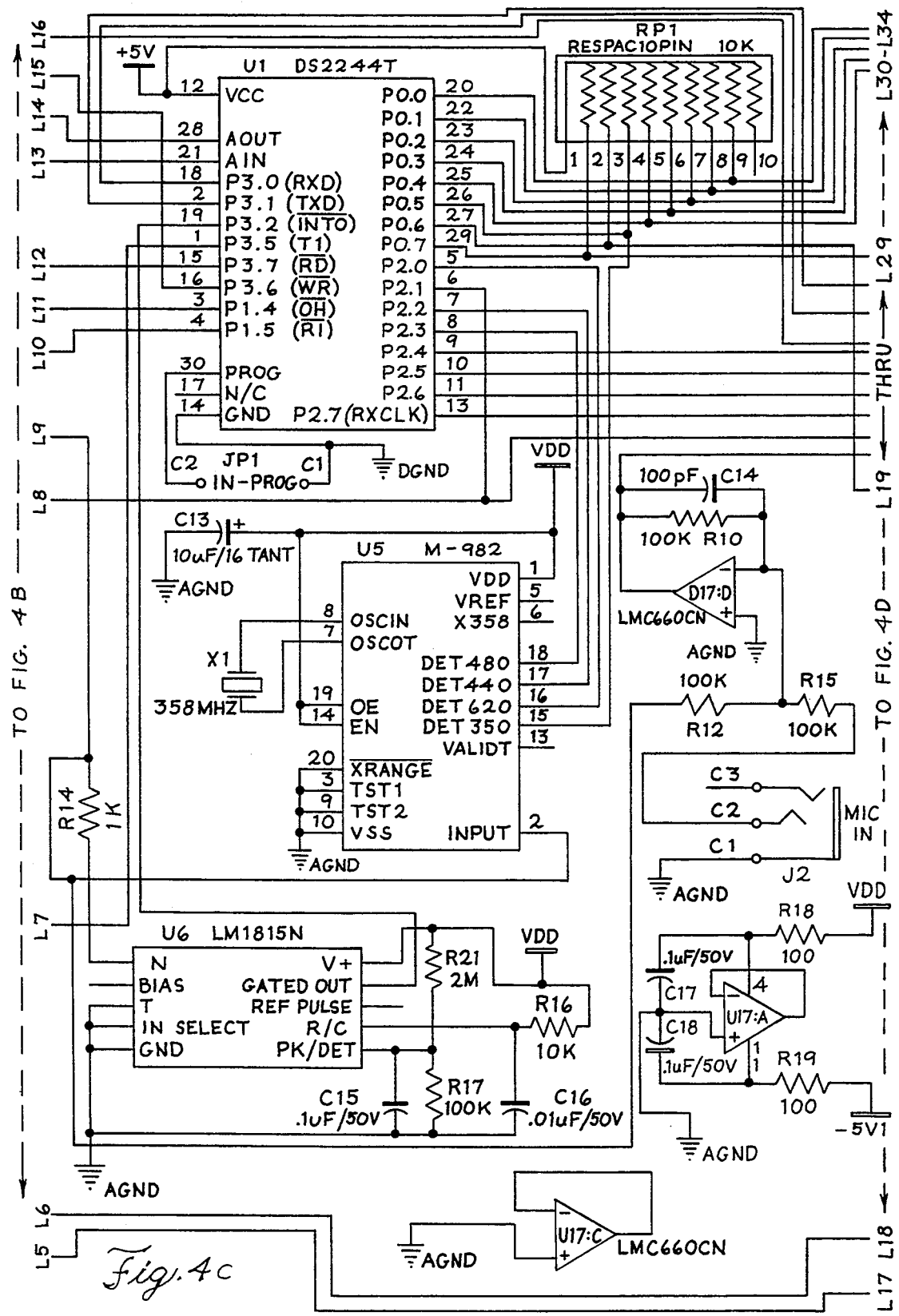
Figure 4D:
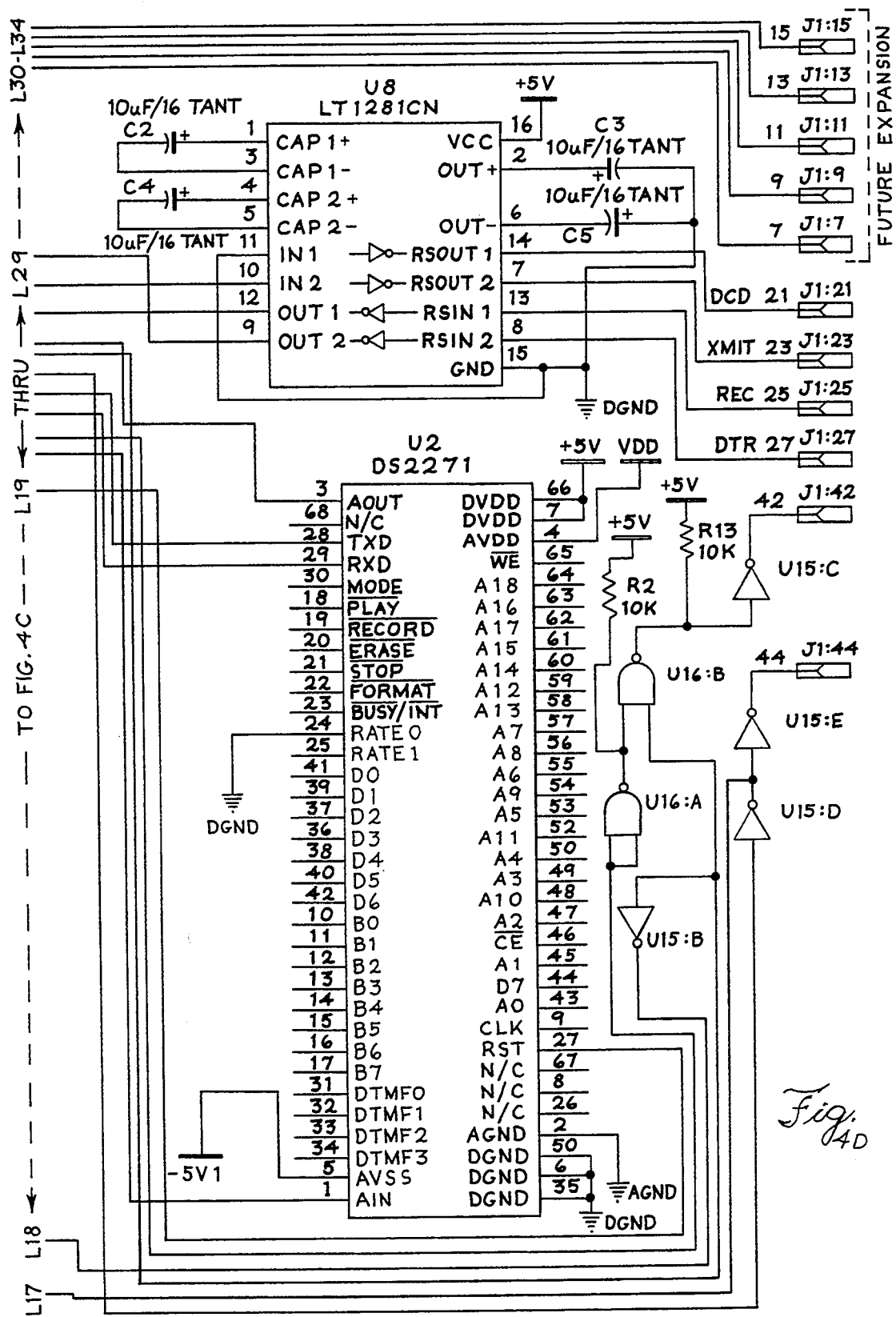

FIG. 7 illustrates the power supply board. The power supply board converts the −48 V DC central office supply to the 12 V DC needed by the electronic components on the other circuit cards in the test set 54. The power supply card consists of DC—DC convertor CU1 which is a solid state regulated switching power supply. Diode CD1 is used to protect the power supply against reverse current. LED C1 provides a visual indication that the circuit is functioning properly.

The firmware which operates the test card 54 is illustrated in flow-chart form in FIGS. 8A-8H. In the idle state the remote test set is reset and waits for a call on the modem line. When an incoming call is received, the test set checks that the call is valid and waits for command or test call request. On receipt of a con, hand for a parameter change or line change etc., the test set completes the request and responds to the central computer. If a test call is requested, the test set accepts the digits to be dialed and the test code and proceeds to place the test call. The test set then responds whether the test call was successful. The test set then waits for another command or test call. If the test set receives a disconnect, it returns to the idle state.

The invention has been described according to the preferred embodiments contemplated at the present time. Of course, it will be understood that a wide range of changes and modifications can be made to the preferred embodiments described above. It is intended that the foregoing details description be regarded as illustrative rather than limiting, and that it be understood that it is the following claims including all equivalents which are intended to define the scope of the invention.

APPENDIX A ©ILLINOIS BELL 1992

Program Components
1. ANALYZE COMMAND LINE
2. PERFORM ACTION VERB
   OR
3. MAKE APPROPRIATE TEST CALLS
4. SUBROUTINE FUNCTIONS
   A. OTHERS
   B. SPECIFIC TESTS 1-99

We claim:

1. A telephone transaction test system for checking, from a central testing location, telephone billing transactions to a plurality of telephone calls made in a plurality of different class of services, wherein each class of service has a different billing rate for the same telephone call, the system comprising:
   a processor disposed at a first central location, the processor connected to an input device for inputting test data to the processor, the test data indicating a telephone call to be made to a respective telephone number and the class of service in which the telephone call is to be made, the processor generating a test signal in response to the test data;
   a memory operatively connected to the processor and having stored therein correct billing data for telephone calls made in each different class of service;
   means for transmitting the test signal from the processor;
   a common telephone line connected at one end to the means for transmitting data from the processor;
   a test set disposed at a second location remote from the first location, the test set including i) means for receiving the test signal from the processor, ii) means for connecting the common telephone line to a plurality of test lines, iii) means for selecting one of the plurality of test lines in response to the test signal, and iv) a detector operatively connected to receive test signals from the test line selected, the test set identifying and storing successful completion of test signals received by the test set in a success file;

2. The test system of claim 1 wherein the detector comprises a tone detector.

3. The test system of claim 1 wherein the means for forwarding the success file data comprises a storage media.

4. The test system of claim 1 wherein the means for forwarding the success file data comprises a polling processor.

5. The test system of claim 1 further including means for monitoring the test at the central location.

6. The test system of claim 1 wherein the means for receiving the test signal from the processor comprises a modem.

7. The test system of claim 1 wherein the means for transmitting the test signal from the processor comprises a modem.

8. A telephone transaction test system for checking, from a central testing location, telephone billing transactions to a plurality of telephone calls made in a plurality of different class of services, wherein each class of service has a different billing rate for the same telephone call, the system comprising:
   a processor disposed at a first central location, the processor connected to an input device for inputting test data to the processor, the test data indicating a telephone call to be made to a respective telephone number and the class of service in which the telephone call is to be made, the processor generating test signal in response to the test data;
   a memory operatively connected to the processor and having stored therein correct billing data for telephone calls made in each different class of service;
   means for transmitting the test signal from the processor;
   a common telephone line connected at one end to the means for transmitting data from the processor;
   a test set disposed at a second location remote from the first location, the test set including i) means for receiving the test signal from the processor, ii) means for connecting the common telephone line to a plurality of test lines, iii) means for selecting one of the plurality of test lines in response to the test signal, and iv) a tone detector operatively connected to receive test signals from the test line selected, the test set identifying and reporting successful completion of test signals received by the test set in a success file;
   means for forwarding the success file data received in the test set to the processor; and the processor including logic comparing the data in the success file and comparing the data to the billing data stored in the memory and generating a result signal in response to the comparison.

9. The test system of claim 8 wherein the means for forwarding the success file data comprises a storage media.

10. The test system of claim 8 wherein the means for forwarding the success file data comprises a polling processor.

11. The test system of claim 8 further including means for monitoring the test at the central location.

12. The test system of claim 8 wherein the means for receiving the test signal from the processor comprises a modem.

13. The test system of claim 8 wherein the means for transmitting the test signal from the processor comprises a modem.

14. A telephone transaction test system for checking, from a central testing location, telephone billing transactions to a plurality of telephone calls made in a plurality of different class of services, wherein each class of service has a different billing rate for the same telephone call, the system comprising:
- a processor disposed at a first central location, the processor connected to an input device for inputting test data to the processor, the test data indicating a telephone call to be made to a respective telephone number and the class of service in which the telephone call is to be made, the processor generating a test signal in response to the test data;
- a memory operatively connected to the processor and having stored therein correct billing data for telephone calls made in each different class of service;
- a first modem operatively connected to transmit the test signal from the processor;
- a common telephone line connected at one end to the first modem;
- a test set disposed at a second location remote from the first location, the test set including i) a second modem operatively connected to receive the test signal from the processor, ii) means for connecting the common telephone line to a plurality of test lines, iii) means for selecting one of the plurality of test lines in response to the test signal, and iv) a tone detector operatively connected to receive test signals from the test line selected, the test set identifying and reporting successful completion of test signals received by the test set in a success file.
- means for forwarding the success file data received in the test set to the processor; and
- the processor including logic comparing the data received from the test set and comparing the data to the billing data stored in the memory and generating a result signal in response to the comparison.

* * * * *

UNITED STATES PATENT AND TRADEMARK OFFICE
CERTIFICATE OF CORRECTION

PATENT NO. : 5,369,680
DATED : November 29, 1994
INVENTOR(S) : William F. Borbas et. al.

It is certified that error appears in the above-indentified patent and that said Letters Patent is hereby corrected as shown below:

IN THE CLAIMS

Column 10:
  In claim 14, line 21, after "file" delete "." and substitute --;--.

Signed and Sealed this

Sixteenth Day of May, 1995

Attest:

BRUCE LEHMAN

*Attesting Officer*      *Commissioner of Patents and Trademarks*